US008407015B2

(12) United States Patent
Yatir et al.

(10) Patent No.: US 8,407,015 B2

(45) Date of Patent: Mar. 26, 2013

(54) METHOD AND APPARATUS FOR MONITORING AND CONTROLLING AN ELECTRICAL BOILER

(76) Inventors: Isaac Yatir, Nordia (IL); Niv Tal, Lapid (IL)

(*) Notice: Subject to any disclaimer, the term of this patent is extended or adjusted under 35 U.S.C. 154(b) by 519 days.

(21) Appl. No.: 12/663,949

(22) PCT Filed: Jun. 15, 2008

(86) PCT No.: PCT/IL2008/000810

§ 371 (c)(1), (2), (4) Date: Feb. 24, 2010

(87) PCT Pub. No.: WO2008/152645

PCT Pub. Date: Dec. 18, 2008

(65) Prior Publication Data

US 2010/0153030 A1 Jun. 17, 2010

(30) Foreign Application Priority Data

Jun. 14, 2007 (IL) .......................................... 183970

(51) Int. Cl.

*G01F 17/00* (2006.01)
*G01F 23/00* (2006.01)
*G05D 9/00* (2006.01)
*G01K 3/00* (2006.01)

(52) U.S. Cl. .......... 702/55; 700/281; 374/102; 73/290 R

(58) Field of Classification Search .................... 702/55, 702/45, 50, 66–68, 70–71, 79, 81, 84, 127, 702/130–131, 179–183, 188–190, 199; 374/100, 374/102, 104, 107–112, 135, 137, 147–148; 700/275–278, 281; 73/1.16, 1.31, 1.73, 202.5, 73/204.11, 204.16, 204.19, 204.22–204.23, 73/290 R, 291–292, 295, 861, 861.01

See application file for complete search history.

(56) References Cited

U.S. PATENT DOCUMENTS 6,002,114 A 12/1999 Lee
2004/0173600 A1 9/2004 Munsterhuis et al.
2005/0004712 A1 * 1/2005 Stevens et al. ................ 700/266
2007/0005190 A1 1/2007 Feinleib

* cited by examiner

FOREIGN PATENT DOCUMENTS

WO 2006079123 7/2006

*Primary Examiner* — Toan Le

(74) *Attorney, Agent, or Firm* — Roach Brown McCarthy & Gruber, P.C.; Kevin D. McCarthy

(57) ABSTRACT

The invention relates to a method for determining the amount of warm water in a water tank of domestic water heating system, which includes: (a) Pre-determining various situation graphs, each graph describes the variation of the water temperature in said water tank as a function of time, in one specific operational situation of the system; (b) Dividing each of said graphs to plurality of sections, each graph section describes the variation of the water temperature in the water tank as a function of time, during a sectional period of time; (c) Determining for each graph section the percentage of warm water in the tank at the end of said section; (d) Storing in a memory storage said plurality of graph sections, and the corresponding percentage of warm water in the tank at the end of said section, as determined; (e) During the operation of the heating system, sampling periodically the temperature in the tank; (f) For each present sequence of samples, finding in said memory storage the most similar graph section, and further finding in said memory storage the percentage of warm water that corresponds to said graph section, said found percentage define the present percentage of warm water in the tank; and (g) Displaying to the user said present percentage of warm water in the tank, as found.

15 Claims, 5 Drawing Sheets

| Section | TIME (min) | TEMP. (deg.) | Min. Temp. 38 | Min. Temp. 40 | ... |
|---|---|---|---|---|---|
| 1A | 0 | 20 | | | |
| | 2.5 | 21.5 | | | |
| | 5 | 24 | | | |
| | 7.5 | 27 | | | |
| | 10 | 31 | 14.0% | 12.0% | ... |
| 1B | 12.5 | 36 | | | |
| | 15 | 43 | | | |
| | 17.5 | 51 | | | |
| | 20 | 62 | 90.0% | 88.0% | ... |

| | | | | | |
|---|---|---|---|---|---|
| 2A | 0 | 70 | | | |
| | 2.5 | 69.75 | | | |
| | 5 | 69.5 | | | |
| | 7.5 | 69.25 | | | |
| | 10 | 69 | 99.2% | 99.0% | ... |
| 2B | 12.5 | 68.75 | | | |
| | 15 | 68.5 | | | |
| | 17.5 | 68.25 | | | |
| | 20 | 68 | 98.4% | 98.2% | ... |

| | | | | | |
|---|---|---|---|---|---|
| 3A | 0 | 70 | | | |
| | 2.5 | 57 | | | |
| | 5 | 36 | | | |
| | 7.5 | 25 | | | |
| | 10 | 20 | 0.0% | 0.0% | ... |
| 3B | 12.5 | 20 | | | |
| | 15 | 20 | | | |
| | 17.5 | 20 | | | |
| | 20 | 20 | 0.0% | 0.0% | ... |

| | | | | | |
|---|---|---|---|---|---|
| 4A | 0 | 20 | | | |
| | 2.5 | 20.5 | | | |
| | 5 | 21 | | | |
| | 7.5 | 22 | | | |
| | 10 | 23 | 0.0% | 0.0% | ... |
| 4B | 12.5 | 24 | | | |
| | 15 | 25 | | | |
| | 17.5 | 26 | | | |
| | 20 | 28 | 16.0% | 15.0% | ... |

Fig. 3B

METHOD AND APPARATUS FOR MONITORING AND CONTROLLING AN ELECTRICAL BOILER

REFERENCE TO CO-PENDING APPLICATIONS

Priority is claimed from a 371 of international of PCT/IL2008/000810, filed on Jun. 15, 2008, which claims priority to Israeli patent application number 183970, filed on Jun. 14, 2007.

FIELD OF THE INVENTION

The field of the invention generally relates to electrical home appliances. More particularly, the invention relates to an improved domestic water heating system.

BACKGROUND OF THE INVENTION

Hot water is an essential commodity in the modern world, and a water heating system is an appliance commonly used in households throughout the world.

Energy consuming heating water systems are prevalent today; however, many of them cause a significant waste of energy since typically there is no way of knowing the amount of hot water present in the water tank, and all the water in the tank is heated even though a small amount is needed.

In some countries, where energy is relatively expensive, solar energy is used for heating the water. However, the solar energy cannot generally provide hot water 24 hours a day, 365 days a year, and therefore complementary heating involving energy consumption is required. The source of energy for this purpose, in most cases, is electricity.

In order to save energy, it is preferable to heat only the amount of water needed. However, in water heating systems of the prior art, the user is not provided with any indication regarding the amount of hot water in the tank. Generally, this causes the user to activate the heating element of the system either longer time than necessary resulting in a waste of energy, or shorter time than necessary, resulting in a colder and insufficient amount of water than desired. Furthermore, in some of the cases even after the water heating is presumably completed, the user has no indication of the amount of hot water in the tank or its temperature, and must open the tap and wait a relatively long time for regulating the temperature, resulting in a waste of water and time.

The lack of accurate capacity indication of the hot water in the tank causes inconvenience and waste of energy, water and time. In cases wherein the user constantly activates the water heating throughout the day and night, there is even more energy waste, as the user usually over heats the water in the tank. This energy waste is added to the energy loss resulting from the temperature difference between environment and the water in the tank, which in many cases is significant.

Of course there are times when a user requires a relatively larger amount of hot water than in other times. In the systems of the prior art, the pre-planning of the hot water capacity is either unavailable, or unsatisfactory. In conventional water heating systems of the prior art, and particularly for safety purposes, there is a thermostat mounted in a pocket at the bottom of the water tank, which senses the water temperature, and disconnects the electrical supply when a pre-assigned maximum temperature is reached. However, in this case, the regular user does not have access to the thermostat, and does not have control over the pre-assigned disconnecting maximum temperature.

Another drawback of prior art conventional water heating systems is their inability to asses past temperature data of the water heating in the tank, as in many cases this past data can allow a better and more accurate assessment of the average water temperature within the tank or the amount of warm water within the tank. This is particularly due to the fact that the heat distribution within the tank varies in various conditions, and due to the fact that the temperature reading by a single temperature sensor (as is usually used) cannot account for this heat distribution, and for the various distributions of heat during various conditions. For example, there are times in which the water is heated by an electrical power. There are other times in which the water is heated by solar energy, and still other times in which the water is heated both by solar energy and electrical power. Still in other times, water is drained during some type of heating (solar or electrical), and other times in which water is drained during non-heating periods. In any case a system is needed that can process data temperatures of the water in the boiler, taking into account all these possible conditions and accurately assess the average water temperature within the tank, or the amount of heat within the tank.

U.S. Pat. No. 6,002,114 discloses a commercial heating system having four electric heating elements, and a plurality of sensors. The heating elements are activated according to water temperature at the inlet and outlet of the tank, while further considering the inlet water flow rate. Nevertheless, this publication requires a plurality of sensors and it lacks disclosure of a system for heating only the desired amount of water in the tank, in order to save energy.

It is an object of the present invention to provide a water heating system which displays and indicates to the user the amount of hot water in the tank.

It is another object of the present invention to provide a system which allows a user to determine the amount of hot water he needs in a domestic water heating system.

It is still another object of the present invention to provide a domestic water heating system which is capable of assessing the average temperature of the water in the tank based on past temperature readings, and to display the same to the user.

It is still another object of the present invention to provide a system which allows the user to check the efficiency of his water heating system.

Other objects and advantages of the invention will become apparent as the description proceeds.

SUMMARY OF THE INVENTION

The present invention relates to a method for determining the amount of warm water in a water tank of domestic water heating system, which comprises: (a) Pre-determining various situation graphs, each graph describes the variation of the water temperature in said water tank as a function of time, in one specific operational situation of the system; (b) Dividing each of said graphs to plurality of sections, each graph section describes the variation of the water temperature in the water tank as a function of time, during a sectional period of time; (c) Determining for each graph section the percentage of warm water in the tank at the end of said section; (d) Storing in a memory storage said plurality of graph sections, and the corresponding percentage of warm water in the tank at the end of said section, as determined; (e) During the operation of the heating system, sampling periodically the temperature in the tank; (f) For each present sequence of samples, finding in said memory storage the most similar graph section, and further finding in said memory storage the percentage of warm water that corresponds to said graph section, said found percentage define the present percentage of warm water in the tank; and (g) Displaying to the user said present percentage of warm water in the tank, as found.

Preferably, said operational situations are selected from: (a) a situation when the tank is electrically heated; (b) a situation when the tank is both electrically heated and solar heated; (c) a situation when the tank is solar heated; (d) a situation when the tank is electrically heated, and warm water is drained from the tank; (e) a situation when the tank is solar heated, and warm water is drained from the tank; (f) a situation when the tank is solar and electrically heated, and warm water is drained from the tank; (g) a situation when the tank is not solar heated and not electrically heated, and warm water is drained from the tank; (h) a situation when the tank is not solar heated and not electrically heated, and warm water is not drained from the tank.

Preferably, the samples are taken every several minutes.

Preferably, the percentage of warm water in the tank refers to a present amount of warm water in liters in comparison to the maximal amount of warm water possible in the tank.

Preferably, the percentage of warm water in the tank refers to a present average temperature of the water in the tank in comparison to the maximal average temperature possible in the tank.

Preferably, the percentage of warm water in the tank refers to a present amount of heat within the tank, in comparison to the maximal amount of heat possible in the tank.

Preferably, the percentage of warm water in the tank that corresponds to each graph section is determined by means of experiments.

Preferably, the percentage of hot water in the tank that corresponds to each graph section is determined by means of calculations.

The invention also relates to a controller for determining the amount of warm water in a water tank of a domestic water heating system which comprises: (a) memory storage that stores predetermined situation graphs that are divided into sections, each graph describes the variation of the water temperature in said water tank as a function of time in one specific operational situation, said memory storage further stores for each section a corresponding percentage of warm water in the tank, as predetermined for that graph section; (b) a temporary memory for receiving periodical temperature samples from the water tank, and for storing a sequence which formed from plurality of latest of said samples; (c) a comparison algorithm for periodically comparing said sequence of plurality of latest samples with said graphs sections in the memory storage, determining a graph section which is most similar to said sequence, and further determining from said most similar section the corresponding percentage of warm water in the tank; and (d) a display for displaying the determined percentage of warm water in the tank to the user.

Preferably, the controller further comprises a user interface for defining various settings of the system.

Preferably, said temperature samples are transferred from the tank to the controller by means of radio frequency transmission.

Preferably, the temperature samples are transferred from the tank to the controller by means over wired lines.

BRIEF DESCRIPTION OF THE DRAWINGS

In the drawings:

FIG. 3B is an example for the structure of the situations graphs storage.

DETAILED DESCRIPTION OF PREFERRED EMBODIMENTS

Figure 1:
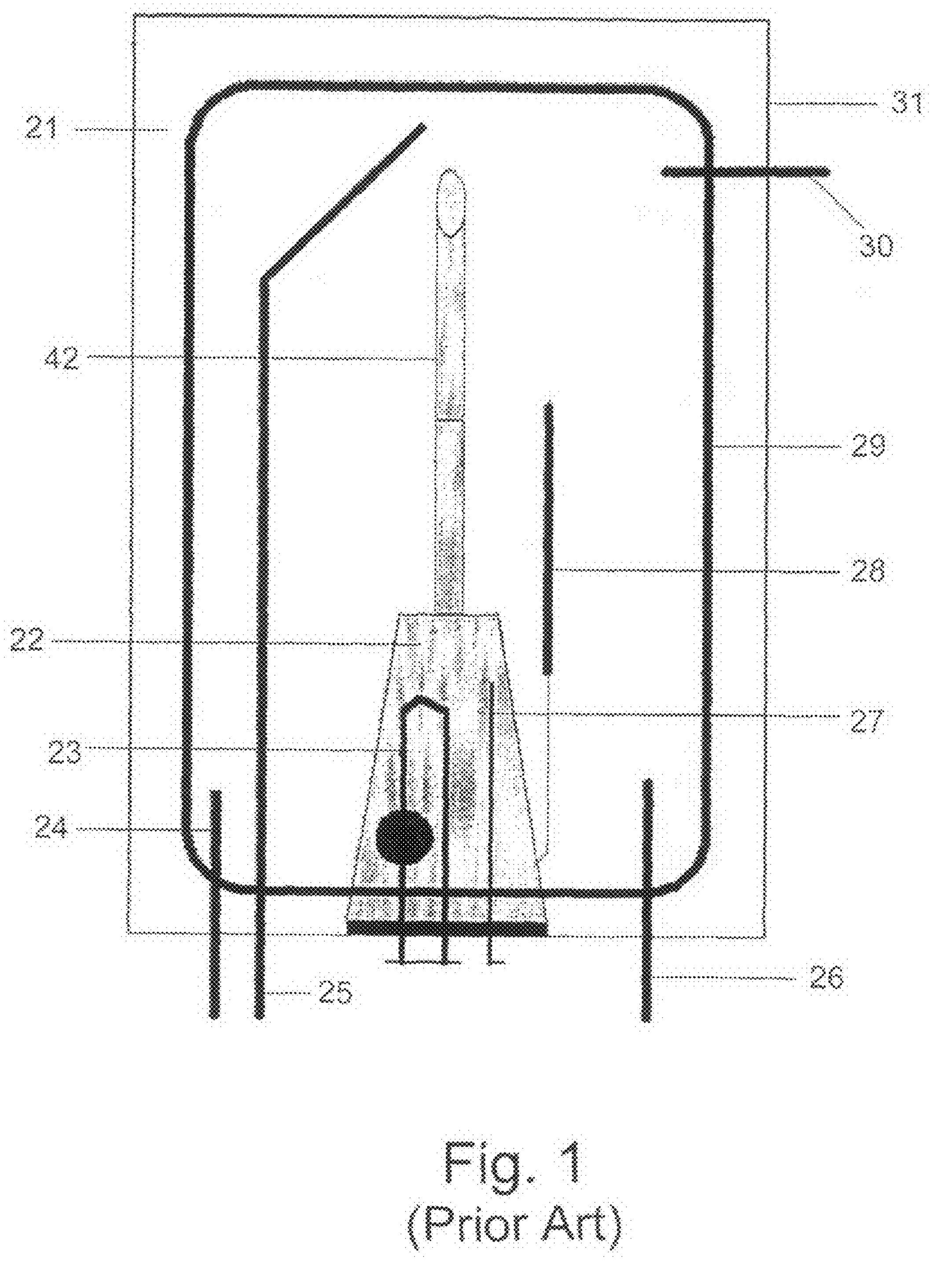
FIG. 1 is a cross-sectional view of a prior art domestic water heating system.

FIG. 1 is a cross-sectional view of a prior art domestic water heating system. The water heating system 31, referred to hereinafter as boiler, typically comprises a water tank 29, and some kind of insulating material 21. Heating element 23, (also referred to hereinafter as a heater), is responsible for electrically heating the water. Thermostat 27 is responsible for turning "OFF" heater 23 when the water reaches a predetermined temperature, typically between 60° C. to 70° C. Water heating accelerator 22 is used for providing hot water relatively faster, by guiding the heated water from heater 23 close to the opening of outlet pipe 25 which supplies the hot water to the user. By guiding the hot water to the proximity of the opening of outlet pipe 25, the water heating accelerator 22 provides the user with hot water faster than, for example, waiting for all the water in tank 29 to heat. Nevertheless, although the user may enjoy some amount of hot water at the beginning of use, there is no assurance that the there is enough hot water at the end of the water use. In other words, due to accelerator 22 (and other factors as well) the dispersing of hot water in the boiler is not uniform in the tank and the user does not have an indication relating to the present total amount of hot water in the tank. Pipe 24 supplies fresh (cold) water to that replace the hot water drained by the user from outlet pipe 25. Thus, when heater 23 is turned "ON" (i.e. supplied with electrical power) and heated, the surrounding water within accelerator 22 start to heat. The heated water is guided by accelerator 22 to the top of boiler 31 where the hot water accumulating. When the user opens a shower or a tap of hot water in his home, pipe 25 starts draining the hot water from the top of boiler 31, while simultaneously pipe 24 supplies fresh cold water at the bottom of the boiler, which replace the drained water. Magnesium Anode 28, although not relevant for the present invention, is used for preventing corrosion. Some of the prior art boilers are also solar heated, and in that case two more pipes are present; pipe 26 for draining cold water into the solar collectors and pipe 30 for returning heated water from the solar collectors to tank 29.

Figure 2:
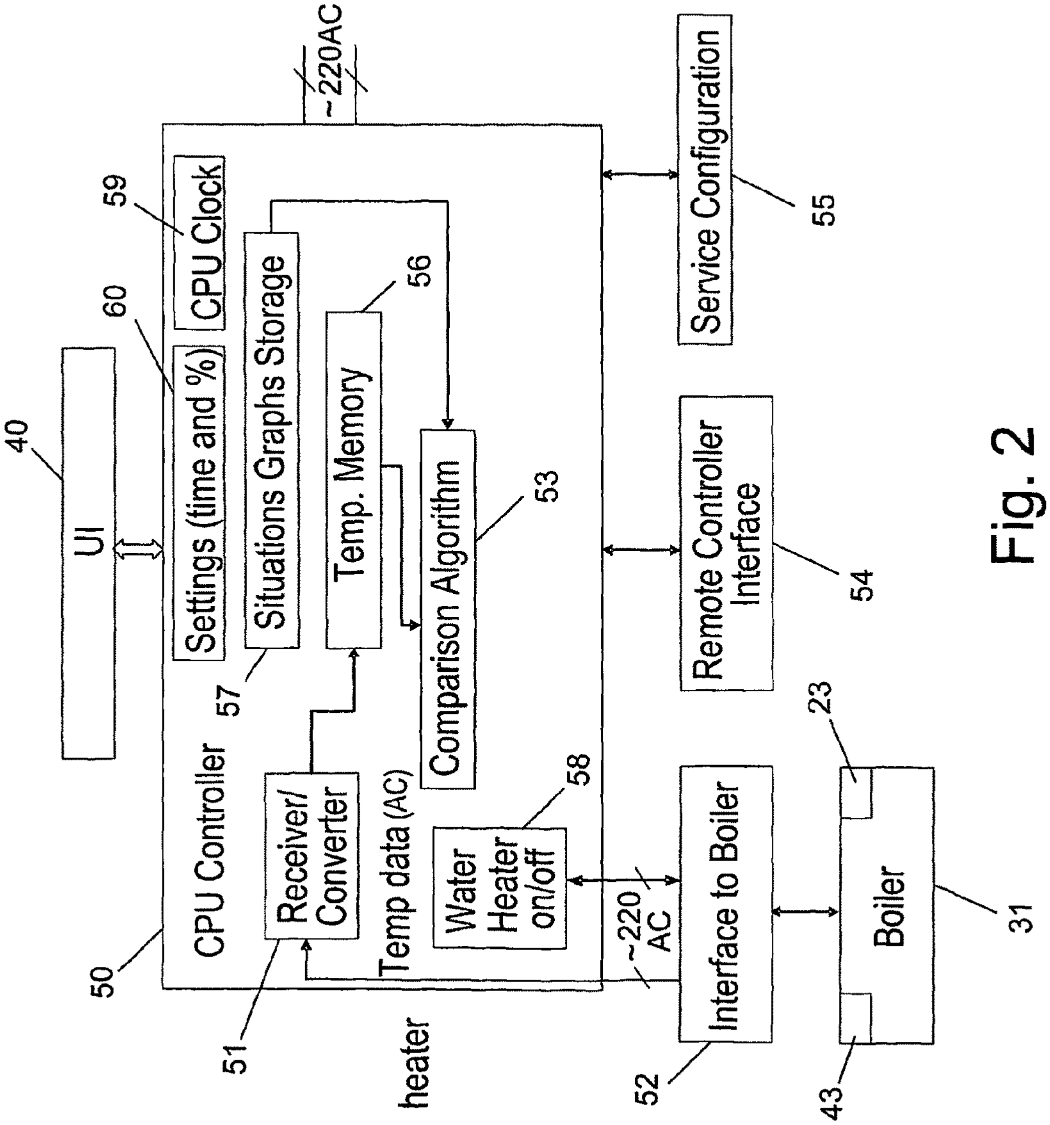
FIG. 2 is a block diagram depicting a boiler system according to an embodiment of the invention.

FIG. 2 is a block diagram depicting a boiler system according to an embodiment of the invention. In the system of the present invention, thermostat 27 which is typically used in the system of the prior art (and shown in FIG. 1), is replaced by an electrical temperature sensor (43 in FIG. 2, also referred to hereinafter as "thermometer"). The thermometer 43 and the heater 23 are each electrically connected separately to the controller 50, which is in turn connected to a User Interface (UI) 40. Controller 50 is responsible for controlling heater 23, i.e. turning "ON" or "OFF", in accordance with the user programmed requirements provided by UI 40, where the programmed requirements by the user may comprise the total amount of hot water required by the user, or the percentage of hot water from the total capacity of the boiler 31 he requires. Controller 50 is connected by means of interface 52 to thermometer 43 of boiler 31 and it receives temperature readings from thermometer 43. The thermometer 43 readings are sampled periodically (for example, every 2.5 minutes), received, and converted to readable digital data by converter 51 and are temporarily stored within Temporary Data Memory 56. Temporary data memory 56 acts as a FIFO, which stores each period a sequence of latest readings (for example, 8 readings) from thermometer 43. These readings are compared by Comparison Algorithm 53 to stored data samples in the Situations Graphs Storage 57 in order to find most similar sequence, identify the state of the boiler, and the corresponding percentage of warm water within tank 29 (the percentage of warm water is defined as the amount of water above a predefined specific temperature, divided to the total amount of water within tank 29). The process of comparing, the Comparison Algorithm 53, and the Situations Graphs Storage 57, will be described later with respect to FIGS. 3A and 3B. Once Controller 50 finds the state and the percentage warm water within tank 29, it processes this information together with the programmed requirements of the user as received from User Interface 40 and stored in settings storage 60. Once the Controller 50 has deduced that the boiler's water tank has the required percentage or amount of hot water, as is the case, it turns "OFF" the heater 23 using switch 58. In one of embodiment, Controller 50 continues to monitor the state of the boiler for controlling heater 23, e.g. turning it "ON" or "OFF" as is necessary. The controller 50 may also use a clock component 59 for performing the required tasks as is conventional. Service Configuration Interface 55 allows a technician, or the user to set specific parameters of the controller according to the user's needs, particularly the minimum temperature parameter for defining warm water. The term warm water, as opposed to the term hot water, is referred to hereinafter as the water having a temperature above a predefined minimum temperature. As said, the percentage of warm water requested by the user is actually the percentage of water in the tank having at least this minimum temperature. For example, a technician may define the minimum temperature of warm water to be 40° C. at the time of installation, whereas the percentage of warm water as displayed to the user by means of UI 40 is actually the percentage of warm water within the tank having a temperature above said predefined 40° C. Service configuration Interface 55 may also be used for programming the total capacity of the water tank. In one embodiment, a Remote Controller Interface 54 is added to Controller 50 in order to allow the user to control the Controller 50 from a distance, such as through the Internet.

Figure 3A:
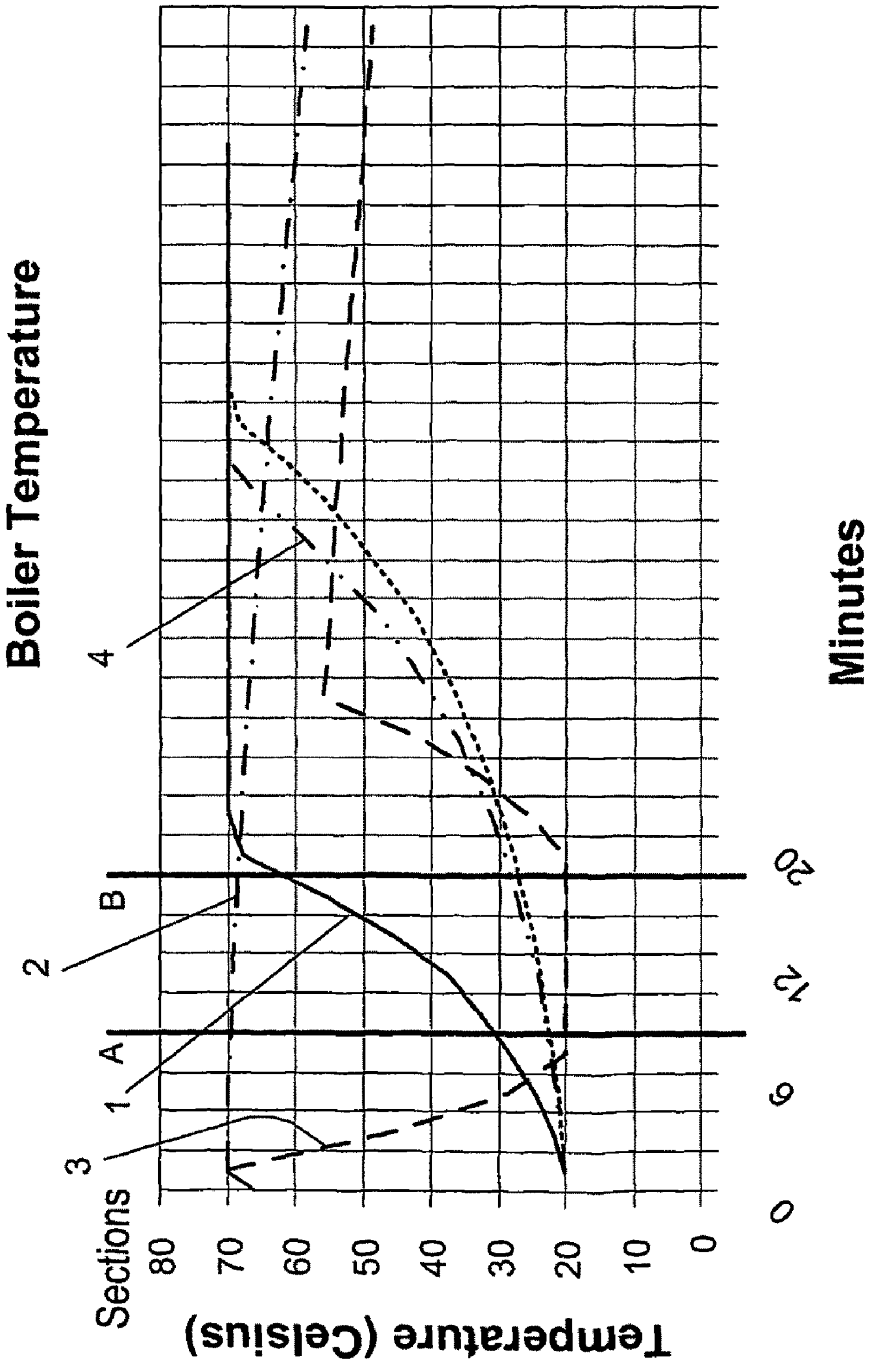
FIG. 3A describes the water temperature variation in the tank in various situations.

FIG. 3A describes the water temperature variation in the tank in various situations. The Situations Graphs Storage 57, as mentioned with respect to FIG. 2, is a database which contains graphs in a digital form that each describes one specific heat process (situation) of the boiler. For example, graph 1 illustrates a process where the boiler heats up by electricity and solar energy, while no water is drained from the tank. Graph 2 shows a slow cooling of the water, after a previous heating. Graph 3 relates to the situation when the temperature of the water drops very fast after a previous heating, due to drainage of hot water. Graph 4 illustrates a slow heating of the water by means of solar energy, while no drainage occurs. The various graphs may be stored as discreet sequential data samples in a table form (as shown in FIG. 3B), as a formula, or as any other manner of storage. In addition to storing the data of the graphs, As will discussed with respect to FIG. 3B, each graph is preferably divided into plurality sections, each section represents plurality of sequential samples. The Situations Graphs Storage 57 therefore comprises plurality of sections entries for each situation, and each section entry also comprises a predetermined percentage level of warm water which corresponds to this section. The manner by which the percentage of warm water which corresponds to each section is determined will be discussed later. As said, Situations Graphs Storage 57 also stores for each graph section a corresponding percentage of warm water in the tank, meaning that each graph section represent a specific amount (or rate) of warm water in the tank. As described, a thermometer 43 is placed inside the boiler and samples the water temperature periodically. The thermometer temperature samples are conveyed to Controller 50, and temporarily stored in the Temporary Memory 56. Temporary Memory 56 is essentially a FIFO that stores a predetermined number of water temperature samples from the tank. The content of Temporary Memory 56 (i.e., plurality of samples) are compared by means of comparison algorithm 53 with the plurality of graph sections within Situations Graph Storage 57, in order to determine the most similar graph section. The finding of the most similar (i.e., having the highest correlation) graph section enables the determination of the present situation of the boiler system, and moreover, the corresponding percentage of warm water in the tank. A thorough example will be provided with respect to FIG. 3*b*. For example, if the sequential readings (i.e., temperature samples) from the thermometer show a slow decline in temperature for a few minutes, as in graph 2, the controller can deduce (by comparing with the prerecorded stored data) that the boiler is cooling down after heating, and this cooling down correlates to a specific section of graph 1, and therefore the percentage of warm water of the tank is accordingly determined, as it is already prerecorded within situations graph storage 57. In another example, if the samples show a steep rise in the temperature readings, as in the first 20 minutes of graph 1, which suggests that the boiler is both electrically and solar heated, the comparison result can provide the amount (or percentage) of warm water that corresponds to this graph section. Therefore, once the Controller 50 has deduced the current state of the boiler and the appropriate section, it can determine the present percentage of warm water in the tank based on the pre-determined percentage level. The amount of warm water, or the percentage of warm water within the tank which corresponds to each graph section can be performed in various ways, for example, by laboratory or field tests or by means of calculations.

FIG. 3B provides an example for the data structure within Situations Graphs Storage 57. In one of the embodiments these samples are stored in said Situations Graphs Storage of the system. For the sake of the example it is assumed that the thermometer 43 in the boiler supplies readings every 2.5 minutes, and 4 consecutive samples are gathered to correspond to a section of a graph. Of course another time interval between the samples may be used, and the graphs may be divided to any number of sections. In this example, once a section containing 4 readings is received, the Comparison Algorithm 53 compares them to the readings stored in Situations Graphs Storage 57. For example, if the received readings form a fast rise in the temperature such as: 22°, 25°, 28°, 30°, the Comparison Algorithm finds the closest matching graph section, which in this example is section 1A having the samples of: 21.5°, 24°, 27°, 31. Section 1A is the first part of graph 1 of FIG. 3A. Therefore, if the pre-defined minimum temperature for warm water is 40° the percentage of warm water is 12%, as appearing in the table of FIG. 3B. In another example, the received readings form a slow rise in the temperature such as: 24°, 25°, 26°, 27°, the Comparison Algorithm concludes that the readings belong to section 4B of FIG. 3B. Therefore, assuming that pre-defined minimum temperature for warm water is 40° the percentage of warm water is 15%. As shown, the table of FIG. 3B also includes a column for the case when the pre-defined minimum temperature for warm water is 38°, for use in a case when the user pre-defines the minimum temperature for warm water to be 38°.

The temperature readings of the various states and their percentages as pre-stored in the Situations Graphs Storage 57 may be determined in lab or field experiments, where the boiler's water is drained following specific situations, and the drained water temperature is measured until reaching said pre-defines minimum temperature for warm water. For example, for determining the percentage of warm water in the tank during electric heating, which is one of the possible situations, the boiler may be heated for a number of minutes where the reading from the sensor in the boiler are read and saved. Then the boiler is drained and the temperature of the water drained from the boiler is measured until the temperature falls beneath said pre-defined minimum temperature. At this point, the draining is stopped, and the amount of drained water is compared with the total capacity of water in the boiler, for determining the corresponding percentage of warm water for this specific graph section. The calculated percentage is then stored together with the corresponding graph section within Situations Graphs Storage 57. This procedure is preformed with respect to each graph section, and with respect to all the graph situations.

It should be noted that the above example for pre-defining "warm water" to be above a specific pre-defined temperature (for example, 40°), is only an example. In other cases, for example, the average temperature (which is different than the temperature as sampled by thermometer 43) may be stored within Situations Graphs Storage 57, and this value may be provided to the user instead. In still another embodiment, the amount of heat (in calories) may be provided. There are various ways for determining the corresponding values for each section, some of them by means of tests, and others by means of calculations. Therefore, the term "percentage" when given herein may refer to an amount of water (in liters) out of the total amount of water, to a present average temperature in comparison to a maximal possible average temperature within the tank, or to a present amount of heat within the tank in comparison to a maximal possible heat that the tank can store. All these terms are equivalent.

An example of a formula when the boiler's heater heats the water in the tank, assuming an ideal system with no heat loss to the environment, may be:

$$\Delta t * PH = m_w * Cp * ((T\text{topCurrent} - TmDn)/2 - T\text{start})$$

where:

Δt—is the time in seconds that it takes to heat the water from one temperature to another.

PH—is the electrical heater power.

$m_w$—is the water capacity in the tank (liters).

Cp—is the water heat capacity=4200 J/KgC.

TtopCurrent—is the current temperature at the top of the tank.

TmDn—measured temperature at the bottom of the tank.

Tstart—is the starting water tank temp.

The formula may be developed by dividing the tank to a number of virtual vertical layers and adding the values of the layers together:

$$\Sigma\{V1 * Cp * (TmDn - T\text{start}) + V2 * Cp(TmDn + \Delta T\text{top}Dn/(n-1)T\text{start}) + V3 * Cp(TmDn + 2 * \Delta T\text{top}Dn/(n-1) - T\text{start}) + V4 * Cp(TmDn + 3 * \Delta T\text{top}Dn/(n-1) - T\text{start}) \ldots Vn * Cp(TmDn + (n-1) * \Delta T\text{top}Dn/(n-1) - T\text{start})\}$$

where:

Tstart—is the starting water tank temperature.

V—represents the water volume of each layer of the tank (liter).

ΔT—is the difference between the starting water tank temperature and the target temp.

ΔTtopDn—is the average steady state temperature difference between the top of the tank to the bottom of the tank, and therefore:

$$T\text{topCurrent} = TmDn + \Delta T\text{top}Dn$$

Thus the Controller is able to approximately determine at each moment the average temperature of each layer of water in the tank. Each layer's average temperature is then used to determine the percentage of warm water in that layer according to predefined formulas or tables, stored in Situations Graphs Storage 57. The total percentage of warm water in the tank is then calculated by adding together the partial percentages of warm water in each layer. The total percentage of warm water in the tank is then compared to the predetermined percentage.

In an embodiment of the invention the boiler Controller 50 is also capable of testing the efficiency of the boiler. The efficiency of the boiler may be tested by comparing the samples from the boiler's thermometer with the stored data samples of an ideal boiler. Thus, if for example the heater of the boiler loses some of its heating power the controller may either notify the user, or the controller may update its stored data to comply with the new capabilities of the heater. In another embodiment the controller is also able to determine when there is an electrical heater failure.

As understood there are a number of options to send the temperature readings from the thermometer, which is located at the bottom of the tank, to the boiler controller, which may be located at a number of places in the house. For the sake of enablement, two methods for transmitting this data are disclosed: data delivery over the power lines or wireless communication using RF technology. An example of a standard which may be used for delivery of data over power lines is the X-10 standard. The X-10 is a communications protocol that allows compatible products to communicate one with the other using existing electrical wiring of the house. Most X-10 compatible products are cost effective and the fact that they can communicate over existing power lines reduces the cost of rewiring. An example of an X-10 compatible product is "transmitter PL513" which can be coupled to the thermometer for transmitting the temperature readings to a receiver coupled to the controller.

Figure 4:
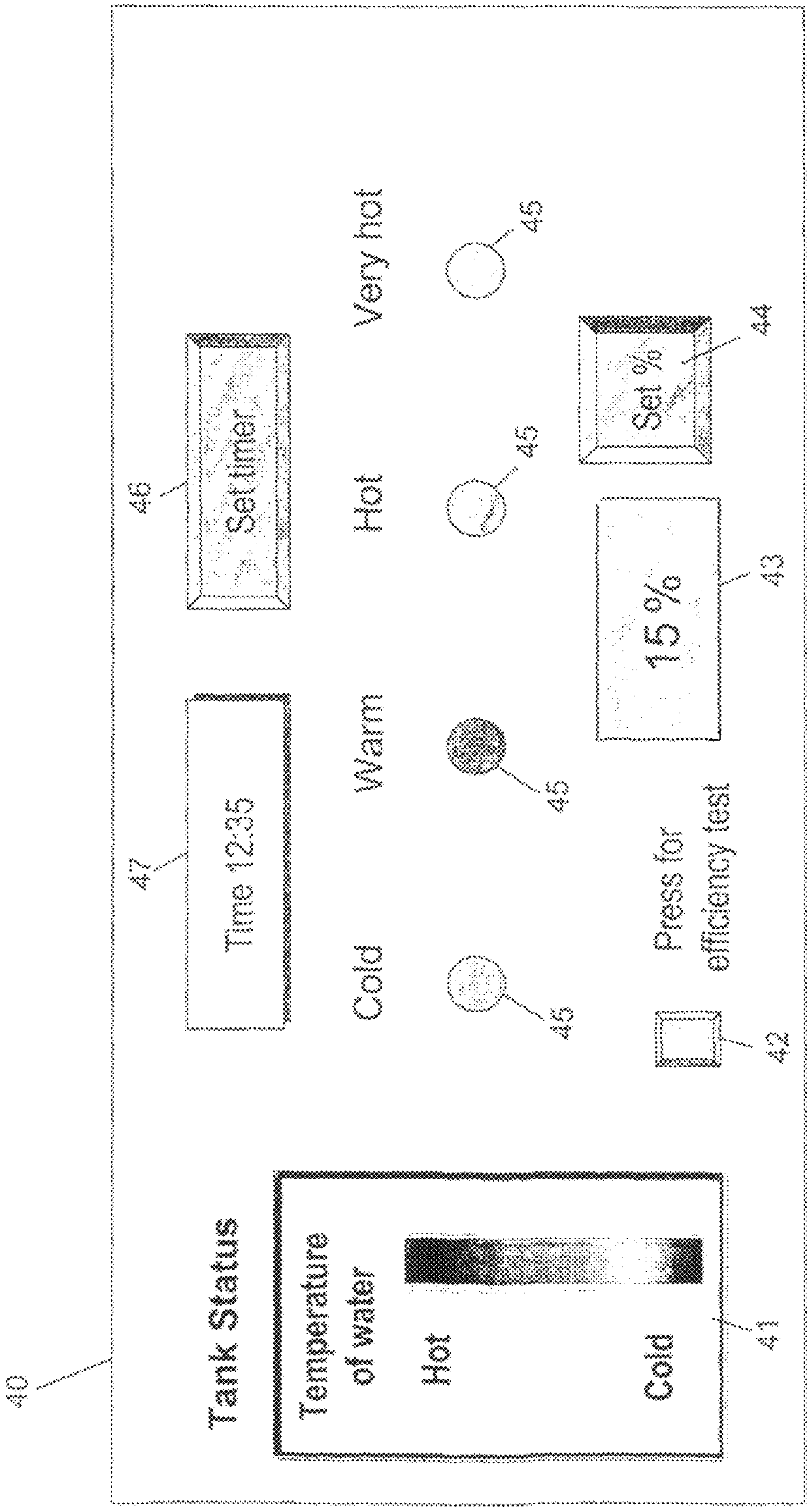
FIG. 4 describes a User Interface for the Controller of the system of the invention, according to one embodiment.

FIG. 4 describes a User Interface (UI) 40 for the controller of the boiler of the invention, including displays and push buttons, according to one of the embodiments. UI 40 comprises a number of displays for informing the user, and a number of control keys for receiving commands and requirements. In one embodiment, the tank status display 41 displays the present average temperature of the water in the tank in a visual form, whereas the LEDS 45 display a coarser approximation of the water average temperature. Other embodiments may have different displays of water temperature or no temperature displays at all. Percentage display 43 may display the present percentage/amount of warm water in the boiler, or it may display the required percentage programmed by the user. For example, if the determined warm temperature is 40° C., and display 43 informs 15%, then 15% of the water in the tank has a temperature above 40° C. Furthermore, since the capacity of the boiler's tank is known, the amount of warm water in the tank can be easily calculated. According to one of the embodiments UI 40 has a clock display 47 for showing the time. As understood other embodiments of UI 40 may include a different clock display or no clock display at all. According to one of the embodiments, UI 40 has a control key 46 for setting a timer for starting the boiler operation. Other embodiments may not include control key 46. Control key 44 is used for controlling the percentage of hot water the user wishes to have in his boiler, and test key 42 is used for requesting an efficiency test of the boiler. The efficiency test of the boiler is conducted as described before.

In one of the embodiments the UI has only one control key for determining the percentage of warm water and one information display for displaying this information.

In one embodiment, the percentage of hot water in the tank is calculated with respect to the maximum possible temperature of the water in the tank. Meaning that, the calculations are made by dividing the tank to a number of virtual vertical layers and comparing the average temperature of each layer to its predefined maximum temperature, and then averaging the results of all the layers. For example, a typical prior art domestic water heating system may be heated until the thermostat at its bottom reads 70° C. Experiments have shown that if the temperature of the water at the bottom of the tank reach 70° C. than the temperature of the water at the top of the tank reach around 85° C. For the sake of brevity the water tank is virtually divided into 15 vertical layers where the maximum temperature of the bottom layer is 70° C. and maximum temperature of the top layer is 85° C., although the tank may be divided into any number of virtual layers for calculations. Since the controller of the invention is capable of estimating the average temperature of each layer by using the method described above with respect to FIG. 3, it can calculate the percentage of hot water in each layer in comparison with its maximum temperature using the following equation:

(average temperature of layer)*100/(maximum temperature of layer)=(percentage of hot water in the layer)

For example if the controller estimates at the present that the top layer has an average temperature of 82° C., the layer is calculated to have 82*100/85=96.47%. Thus all the layers are calculated and averaged together for determining the percentage of hot water in the tank. In one of the embodiments, layers that have an average temperature less than the defined minimum temperature, for example 40° C., are calculated as 0%. In another embodiment, layers that have an average temperature less than a dynamic reference temperature, such as the measured temperature of the room, are calculated as 0%. In this embodiment another thermometer may be added to the system for measuring this dynamic reference temperature.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for determining the amount of warm water in a water tank of domestic water heating system comprising:

(a) pre-determining various situation graphs, each graph describes the variation of the water temperature in said water tank as a function of time, in one specific operational situation of the system;

(b) dividing each of said graphs to plurality of sections, each graph section describes the variation of the water temperature in the water tank as a function of time, during a sectional period of time;

(c) determining for each graph section the percentage of warm water in the tank at the end of said section;

(d) storing in a memory storage said plurality of graph sections, and the corresponding percentage of warm water in the tank at the end of said section, as determined;

(e) during the operation of the heating system, sampling periodically by means of a single temperature sensor the temperature in the tank, thereby forming a present sequence of temperature samples which includes the present sample, and plurality of older measured samples;

(f) for each said present sequence of temperature samples spanning a specific time duration, finding in said memory storage the most similar graph section, and further finding in said memory storage the percentage of warm water that corresponds to said graph section, said found percentage define the present percentage of warm water in the tank; and (g) displaying to the user said present percentage of warm water in the tank, as found.

2. The method according to claim 1, wherein said operational situations are selected from:

(a) a situation when the tank is electrically heated;

(b) a situation when the tank is both electrically heated and solar heated;

(c) a situation when the tank is solar heated;

(d) a situation when the tank is electrically heated, and warm water is drained from the tank;

(e) a situation when the tank is solar heated, and warm water is drained from the tank;

(f) a situation when the tank is solar and electrically heated, and warm water is drained from the tank;

(g) a situation when the tank is not solar heated and not electrically heated, and warm water is drained from the tank;

(h) a situation when the tank is not solar heated and not electrically heated, and warm water is not drained from the tank.

3. The method according to claim 1, wherein the samples are taken every several minutes.

4. The method according to claim 1, wherein the percentage of warm water in the tank refers to a present amount of warm water in liters in comparison to the maximal amount of warm water possible in the tank.

5. The method according to claim 1, wherein the percentage of warm water in the tank refers to a present average temperature of the water in the tank in comparison to the maximal average temperature possible in the tank.

6. The method according to claim 1, wherein the percentage of warm water in the tank refers to a present amount of heat within the tank, in comparison to the maximal amount of heat possible in the tank.

7. The method according to claim 1, wherein the percentage of warm water in the tank that corresponds to each graph section is determined by means of experiments.

8. The method according to claim 1, wherein the percentage of hot water in the tank that corresponds to each graph section is determined by means of calculations.

9. The method according to claim 1, for further including an efficiency test for the water tank, which further comprises:

pre-storing data samples that represent performance of an ideal tank;

obtaining a present sequence of temperature samples from the tank, as in claim 1, step e;

comparing said present sequence of temperature samples with said pre-stored samples; and based on this comparison, determining deterioration of performance, and issuing notification accordingly.

10. The method according to claim 9, wherein said deterioration of performance relates to loss of heating power.

11. The method according to claim 9, wherein following performance of said efficiency test, updating the stored data to comply with said determined deterioration in the performance of the water tank.

12. A controller for determining the amount of warm water in a water tank of a domestic water heating system comprising:

(a) memory storage that stores predetermined situation graphs that are divided into sections, each graph describes the variation of the water temperature in said water tank as a function of time in one specific operational situation, said memory storage further stores for each section a corresponding percentage of warm water in the tank, as predetermined for that graph section;

(b) a temporary memory for receiving periodical temperature samples from a single temperature sensor which is positioned within said water tank, and for storing a sequence of temperature measurements which is formed from plurality of latest of said samples;

(c) a comparison algorithm for periodically comparing said sequence of plurality of latest samples with said graphs sections in the memory storage, determining a graph section which is most similar to said sequence, and further determining from said most similar section the corresponding percentage of warm water in the tank; and (d) a display for displaying the determined percentage of warm water in the tank to the user.

13. The controller according to claim 12, further comprising a user interface for defining various settings of the system.

14. The controller according to claim 12, wherein the temperature samples are transferred from the tank to the controller by means of radio frequency transmission.

15. The controller according to claim 12, wherein the temperature samples are transferred from the tank to the controller by means of wired lines.

* * * * *